United States Patent
Lane et al.

(10) Patent No.: US 10,453,445 B2
(45) Date of Patent: Oct. 22, 2019

(54) SYSTEM AND METHOD FOR MULTI-USER GPU-ACCELERATED SPEECH RECOGNITION ENGINE FOR CLIENT-SERVER ARCHITECTURES

(71) Applicant: CARNEGIE MELLON UNIVERSITY, Pittsburgh, PA (US)

(72) Inventors: Ian Richard Lane, Sunnyvale, CA (US); Jungsuk Kim, Belmont, CA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 15/435,251

(22) Filed: Feb. 16, 2017

(65) Prior Publication Data

US 2017/0236518 A1   Aug. 17, 2017

Related U.S. Application Data

(60) Provisional application No. 62/389,046, filed on Feb. 16, 2016.

(51) Int. Cl.
| | |
|---|---|
| *G10L 15/00* | (2013.01) |
| *G10L 15/14* | (2006.01) |
| *G10L 15/28* | (2013.01) |

(52) U.S. Cl.
CPC ............ *G10L 15/14* (2013.01); *G10L 15/28* (2013.01)

(58) Field of Classification Search
CPC .. G10L 15/22; G10L 2015/081; G10L 15/197
(Continued)

(56) References Cited

U.S. PATENT DOCUMENTS

5,241,619 A * 8/1993 Schwartz ............... G10L 15/08
704/200
8,886,535 B2 * 11/2014 Chong .................. G10L 15/063
704/10

(Continued)

FOREIGN PATENT DOCUMENTS

WO     WO 2014040003 A1 *   3/2014 ............. G10L 15/34

OTHER PUBLICATIONS

Lee et al, "Multi-stream combination for LVCSR and keyword search on GPU-accelerated platforms," 2014 IEEE International Conference on Acoustics, Speech and Signal Processing (ICASSP), Florence, 2014, pp. 3296-3300.*

(Continued)

*Primary Examiner* — Olujimi A Adesanya
(74) *Attorney, Agent, or Firm* — Michael G. Monyok

(57) ABSTRACT

Disclosed herein is a GPU-accelerated speech recognition engine optimized for faster than real time speech recognition on a scalable server-client heterogeneous CPU-GPU architecture, which is specifically optimized to simultaneously decode multiple users in real-time. In order to efficiently support real-time speech recognition for multiple users, a "producer/consumer" design pattern is applied to decouple speech processes that run at different rates in order to handle multiple processes at the same time. Furthermore, the speech recognition process is divided into multiple consumers in order to maximize hardware utilization. As a result, the platform architecture is able to process more than 45 real-time audio streams with an average latency of less than 0.3 seconds using one-million-word vocabulary language models.

8 Claims, 4 Drawing Sheets

(58) Field of Classification Search
USPC .................................................. 704/231, 235
See application file for complete search history.

(56) References Cited

U.S. PATENT DOCUMENTS

| | | | | |
|---|---|---|---|---|
| 9,390,369 | B1* | 7/2016 | Sinyavskiy | G06N 3/049 |
| 2002/0052742 | A1* | 5/2002 | Thrasher | G06F 9/4428 |
| | | | | 704/251 |
| 2005/0080625 | A1* | 4/2005 | Bennett | G06F 17/3043 |
| | | | | 704/249 |
| 2007/0273699 | A1* | 11/2007 | Sasaki | G06F 9/3879 |
| | | | | 345/502 |
| 2008/0100629 | A1* | 5/2008 | Bakalash | G06F 9/5044 |
| | | | | 345/505 |
| 2011/0022385 | A1* | 1/2011 | Kato | G10L 15/08 |
| | | | | 704/231 |
| 2011/0066578 | A1* | 3/2011 | Chong | G06N 20/00 |
| | | | | 706/12 |
| 2012/0149464 | A1* | 6/2012 | Bone | G06F 9/5044 |
| | | | | 463/30 |
| 2014/0324428 | A1* | 10/2014 | Farraro | G10L 15/22 |
| | | | | 704/244 |
| 2015/0243285 | A1* | 8/2015 | Lane | G10L 15/34 |
| | | | | 704/256.1 |
| 2016/0379632 | A1* | 12/2016 | Hoffmeister | G10L 15/18 |
| | | | | 704/253 |

OTHER PUBLICATIONS

Demko, "A Parallel Processing Library for User-friendly Applications"., 2012, Thesis, University of Manitoba (Canada), 2012.*

Rose et al, "Efficient client-server based implementations of mobile speech recognition services." 2006, Speech communication 48.11 (2006): 1573-1589.*

Friedland et al, "Parallelizing speaker-attributed speech recognition for meeting browsing.", 2010, Multimedia (ISM), 2010 IEEE International Symposium on. IEEE, 2010.*

Welsh et al, "SEDA: an architecture for well-conditioned, scalable internet services.", 2001, ACM SIGOPS Operating Systems Review. vol. 35. No. 5. ACM, 2001.*

Cardinal et al, "Large vocabulary speech recognition on parallel architectures.", 2013, IEEE Transactions on Audio, Speech, and Language Processing 21.11 (2013): 2290-2300.*

Kim et al, "GPU-Accelerated Large Vocabulary Continuous Speech Recognition for Scalable Distributed Speech Recognition", Mar. 20, 2015, GPU Technology Conference, pp. 1-34.*

Chong et al, "An Automatic Speech Recognition Application Framework for Highly Parallel Implementations on the GPU", 2012, Technical Report, Electrical Engineering and Computer Sciences University of California at Berkeley, pp. 1-13.*

Rose, R. C. et al. "An efficient framework for robust mobile speech recognition services." In Acoustics, Speech, and Signal Processing, 2003. Proceedings.(ICASSP'03). 2003 IEEE International Conference on, vol. 1, pp. I-I. IEEE, 2003.

Zhang, W. et al. "The study on distributed speech recognition system." In Acoustics, Speech, and Signal Processing, 2000. ICASSP'00. Proceedings. 2000 IEEE International Conference on, vol. 3, pp. 1431-1434. IEEE, 2000.

Chang, Yu-Shuo et al. "CSR: A Cloud-assisted speech recognition service for personal mobile device." In Parallel Processing (ICPP), 2011 International Conference on, pp. 305-314. IEEE, 2011.

Kim, J. et al. "Accelerating large vocabulary continuous speech recognition on heterogeneous cpu-gpu platforms." In Acoustics, Speech and Signal Processing (ICASSP), 2014 IEEE International Conference on, pp. 3291-3295. IEEE, 2014.

Dixon, P. R. et al. "Fast acoustic computations using graphics processors." In Acoustics, Speech and Signal Processing, 2009. ICASSP 2009. IEEE International Conference on, pp. 4321-4324. IEEE, 2009.

Kveton, P. et al. "Accelerating hierarchical acoustic likelihood computation on graphics processors." In Interspeech, pp. 350-353. 2010.

Dixon, P. R. et al. "Harnessing graphics processors for the fast computation of acoustic likelihoods in speech recognition." Computer Speech & Language 23, No. 4 (2009): 510-526.

Chong, J. et al. "A fully data parallel WFST-based large vocabulary continuous speech recognition on a graphics processing unit." In Tenth Annual Conference of the International Speech Communication Association. 2009.

Kim, J. et al. "H-and C-level WFST-based large vocabulary continuous speech recognition on graphics processing units." In Acoustics, Speech and Signal Processing (ICASSP), 2011 IEEE International Conference on, pp. 1733-1736. IEEE, 2011.

You, K. et al. "Parallel scalability in speech recognition." IEEE Signal Processing Magazine 26, No. 6 (2009).

Kim, J. et al. "Efficient On-The-Fly Hypothesis Rescoring in a Hybrid GPU/CPU-based Large Vocabulary Continuous Speech Recognition Engine." In INTERSPEECH, pp. 1035-1038. 2012.

Hacioglu, K. et al. "A distributed architecture for robust automatic speech recognition." In Acoustics, Speech, and Signal Processing, 2003. Proceedings.(ICASSP'03). 2003 IEEE International Conference on, vol. 1, pp. I-I. IEEE, 2003.

Kim, J. et al. "Multi-user Real-time speech recognition with a GPU." In Acoustics, Speech and Signal Processing (ICASSP), 2012 IEEE International Conference on, pp. 1617-1620. IEEE, 2012.

NVIDIA, CUDA C Programming Guide version 7.5, Sep. 2015.

Mohamed, A. et al. "Acoustic modeling using deep belief networks." IEEE Transactions on Audio, Speech, and Language Processing 20, No. 1 (2012): 14-22.

Hinton, G. et al. "Deep neural networks for acoustic modeling in speech recognition: The shared views of four research groups." IEEE Signal Processing Magazine 29, No. 6 (2012): 82-97.

* cited by examiner

SYSTEM AND METHOD FOR MULTI-USER GPU-ACCELERATED SPEECH RECOGNITION ENGINE FOR CLIENT-SERVER ARCHITECTURES

CROSS-REFERENCE TO RELATED APPLICATIONS

This application claims the benefit under 35 U.S.C. § 119 of Provisional Application Ser. No. 62/389,046, filed Feb. 16, 2016, which is incorporated herein by reference.

STATEMENT REGARDING FEDERALLY SPONSORED RESEARCH

Not applicable.

BACKGROUND OF THE INVENTION

The invention relates generally to speech recognition. More specifically, the invention relates to a method of performing automatic speech recognition for multiple users on a heterogeneous CPU-GPU platform.

Modern multi-user applications are often challenged by the need to scale to a potentially large number of users while minimizing the degradation in service response even under peak load conditions. In particular, large vocabulary continuous speech recognition (LVCSR) applications present an additional hurdle because of the disparity between the number of potentially active users and the limited system ability to provide computationally intensive automatic speech recognition (ASR) services.

In one previous ASR framework, a distributed speech recognition (DSR) system assigned one thread or process per client until the number of clients approached the server peak capacity to prevent performance degradation. This approach generally works well on modern homogeneous multi-core CPU platforms. However, many ASR systems incorporate a GPU-accelerated speech recognition engine to overcome the capacity limitation of conventional multi-core ASR systems because GPUs can accelerate decoding speed significantly. The GPU-accelerated framework presents challenges to scaling because GPUs can only process one GPU kernel at a time and the number of GPU devices per server is limited. As a result, GPU processes can become a serial bottleneck in the overall ASR system despite the GPUs significantly accelerating computationally intensive phases. Therefore, a multi-user ASR engine architecture needs to be specially optimized for CPU-GPU heterogeneous platform to efficiently support many users.

The server arrangement itself poses another issue when scaling for multiple users. Researchers have proposed server arrangements to improve the capacity and efficiency of the overall speech recognition system. One arrangement uses an event-driven, input-output non-blocking server framework, where a dispatcher, routing all the systems events, buffers clients queries on the decoder proxy server, which redirects the requests to a free ASR engine. Another arrangement presents an alternative architecture, where the entire ASR system has been decomposed into 11 functional blocks and interconnected via a hub to allow a more efficient parallel use of the ASR system. However, these works investigate only the optimal server arrangement assuming an ASR engine can support multiple users efficiently. As described above, this is not the case when GPU acceleration is utilized.

Another arrangement proposed a GPU-accelerated ASR engine architecture investigating an optimal task scheduling to minimize the task wait time and share the acoustic model parameters to process more users. However, this work did not propose an ASR engine architecture that leveraged multicore CPUs and GPUs at the same time. It would therefore be advantageous to develop a GPU-accelerated ASR engine architecture capable of serving multiple users.

BRIEF SUMMARY

According to embodiments of the present invention is a method of performing automatic speech recognition using a heterogeneous CPU-GPU arrangement capable of serving multiple users.

The present invention extends previous work on GPU-based ASR acceleration to handle multiple users more efficiently on the CPU-GPU heterogeneous platform. The invention makes use of a "producer/consumer" design pattern to share large models efficiently. Further, disclosed is a new ASR architecture to maximize the utilization of GPU by interleaving audio frames from multiple clients.

DETAILED DESCRIPTION

Figure 1:
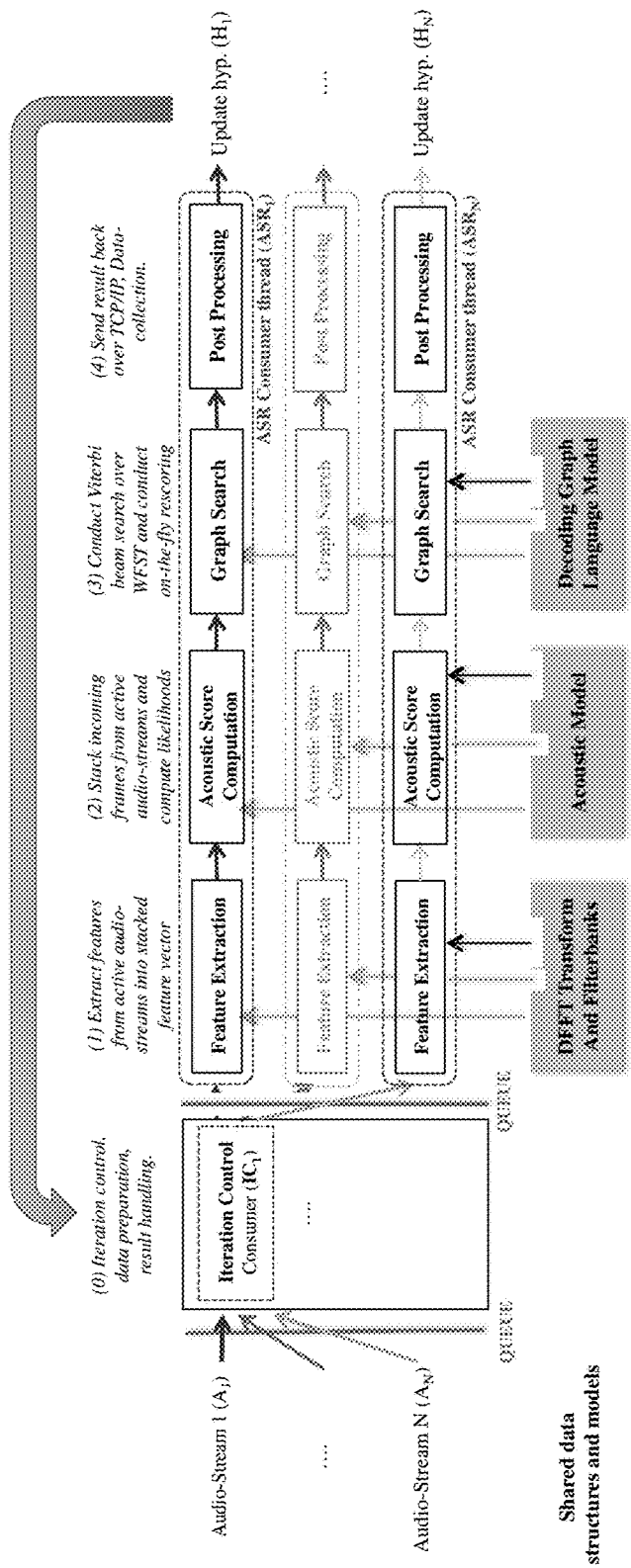
FIG. 1 is a flow diagram for a baseline multi-user speech recognition engine system architecture, according to one embodiment of the present invention.

According to embodiments of the present invention is a speech recognition engine system architecture and a method of performing speech recognition on a server arrangement capable of handling multiple users.

In order to handle as many clients as possible, an ASR should be capable of decoding audio and audio streams quickly. Other previous ASR systems improved decoding speeds significantly by implementing an ASR engine on a GPU. One system in particular used a novel on-the-fly rescoring algorithm specifically optimized for heterogeneous CPU-GPU platforms to resolve GPU memory limitations when large language models were used ($\geq 12$ GB). Using this approach, acoustic score computation and n-best Viterbi search were performed on the GPU using a Weighted Finite State Transducer (WFST) composed with a small language model. During the graph search, partial hypotheses were copied and rescored on-the-fly using a large language model stored on the CPU. Using this approach, the systems were able to realize recognition with a 1 million vocabulary language model at 11× faster than real-time, and approximately 22× faster than a highly optimized single-threaded CPU implementation. However, extending this work to support multiple users is not direct and poses a challenge.

When optimizing a multi-user speech recognition engine on the CPU-GPU heterogeneous platform, there are two critical factors that must be considered. The first factor is the optimization of memory usage. Memory must be efficiently managed in order to simultaneously support hundreds of users per server while retaining large vocabularies and managing complex acoustic and language models. The second critical factor is maximizing hardware utilization. Real-time audio streams only allow a limited number of audio samples. That is insufficient to fully utilize GPU computation capability.

A simple framework for developing a multi-user ASR engine using an existing ASR engine could include assigning a client to one of multiple single user ASR engine processes with a simple router process. In this approach, each ASR process could be idle because the real-time audio stream allows only a limited number of audio samples in a given time. A greater number of ASR processes have to be initiated than the number of processors to achieve maximum hardware utilization. However, this may cause severe context switching and synchronization overheads that degrade system responsiveness. In addition, there could be possible redundant memory allocations if each ASR process loads large models (i.e. language model) separately.

To resolve these issues, the ASR engine of the present invention utilizes a "producer/consumer" pattern for the multi-user ASR engine architecture. The "producer/consumer" design pattern is based on a well-known object oriented programming design known as the "master/slave" pattern. The Master-Slave pattern is often used for multi-threaded applications in which many instances of the same problem must be solved. The master creates and launches slaves to solve these instances in "parallel". When all of the slaves have finished, the master then harvests the results. In the "producer/consumer" approach used in the multi-user ASR engine architecture the objective is to enhance data sharing between multiple loops running at different rates. As with standard "master/slave" design patterns, the "producer/consumer" pattern is used to decouple processes that produce and consume data at different rates. Data queues are used to communicate data between loops. These queues offer the advantage of data buffering between producer and consumer loops. The "producer/consumer" pattern has the ability to easily handle multiple processes at the same time while iterating at individual rates. Using this approach, intermediate decoding results (i.e. partial hypotheses, lattice, etc.) are completely decoupled from the ASR engine and stored in task independently. In this way, the consumer threads can share and process multiple tasks in time-multiplexed manner.

In one example embodiment, an ASR engine architecture, or baseline architecture, applies the "producer/consumer" design pattern to the straightforward approach as shown in FIG. 1. In this architecture, the consumer loop consists of two types of consumers: an Iteration control consumer ($C_{IC}$) and an ASR consumer ($C_{ASR}$). These consumers are connected each other by two non-blocking queues: $Q_{IC}$ and $Q_{ASR}$. Note that each consumer type can have multiple consumer threads.

First, the producer thread (0) accepts an incoming client request over a communication channel (i.e. TCP/IP, UDP), creates a task, and adds it to $Q_{IC}$. Then, any available $C_{IC}$ thread takes this task from the queue, initializes data structures, and adds it to next queue, $Q_{ASR}$. In order to maximize processor utilization, $n_f$ (i.e. 32 frames, 320 ms) speech frames of the task will be interleaved. Interleaving involves, selecting and combining speech frames across multiple tasks into a single data structure. This data structure is then operated on as a unitary object during computation. —Note that the task is added to the $Q_{ASR}$ only when enough speech samples are received. ASR consumer threads extract $n_f$ feature vectors and compute acoustic scores. These acoustic scores will be used to conduct the n-best Viterbi beam search over the WFST network composed with small language model.

Partial hypotheses generated during the search are rescored using the large language model. For example, first, a model likelihood correction factor is computed. Next, the state likelihood of the partial hypothesis is updated using the model likelihood correction factor. After rescoring is performed, partial hypotheses are ranked based on their state likelihoods and those that fall below a ranking threshold are removed from consideration. This search process is iterated until the last sample is encountered, at which point back-track is performed on the CPU generating the final 1-best hypothesis output. A back-track table (a table storing the list of active partial hypotheses, and back-pointers to earlier frames in which the partial hypothesis changed) is shared in working memory between the GPU and CPU. To keep this table synchronized, the CPU copies across back-track information from the GPU to the CPU after each sample has been processed.

All consumer threads share an acoustic model, a WFST network, and a large language model to prevent redundant memory allocations. In the end, the partial recognition result will be sent to the client if it is updated and the task will be added to $Q_{IC}$ until the end of the audio stream.

Usually, a GPU works like a co-processor in CPU-GPU heterogeneous platform. This means only one task can be processed on a GPU at a time. For example, Compute Unified Device Architecture (CUDA) enabled GPUs have thousands of CUDA cores and can initiate more than thousands of threads concurrently. However, these threads execute one instruction at a time following the Single Instruction Multi Thread (SIMT) scheme similar to the vector processor. Some GPU devices can execute multiple kernels concurrently. In most cases, however, only a single GPU kernel can be processed at a time because each GPU kernel uses the full computational capability of the GPU. Therefore, GPU kernels will be serialized when multiple CPU threads are sharing a GPU. As a result, the ASR consumer threads in the architecture of the embodiment described above are not able to process assigned tasks independently. This severely limits the advantage of the "producer/consumer" design pattern.

Figure 2:
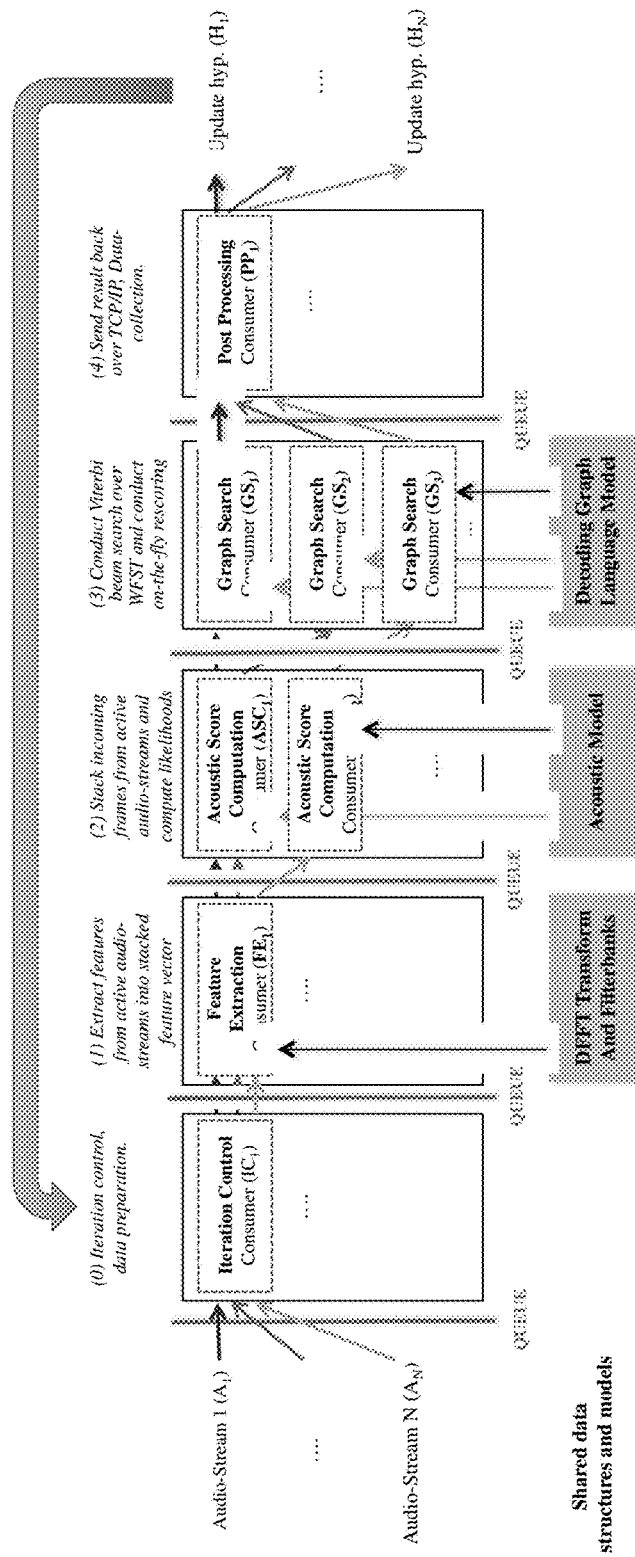
FIG. 2 is a flow diagram of an alternative embodiment of the multi-user speech recognition engine system architecture.

To resolve this issue, an alternative architecture divides the ASR consumer into five different types of consumers (as shown in FIG. 2): Iteration control consumer ($C_{IC}$), Feature extraction consumer ($C_{FE}$), Acoustic score computation consumer ($C_{ASC}$), Graph search consumer ($C_{GS}$), and the Post processing consumer ($C_{PP}$). These consumer threads are cascaded via five queues; $Q_{IC}$, $Q_{FE}$, $Q_{ASC}$, $Q_{GS}$, and $Q_{PP}$. In this embodiment, each consumer can collect multiple tasks in the queue to improve GPU utilization because the GPU computes larger data more efficiently than multiple executions of smaller data sets. Therefore, the acoustic score computation consumer ($C_{ASC}$) can process more data by interleaving audio frames from multiple tasks. In addition, this architecture allows assignment of more CPU threads or GPUs to the bottleneck consumer type to improve the overall ASR engine performance. Furthermore, updating ASR algorithm is more convenient than the baseline architecture. For example, the "on-the-fly rescoring" algorithm can be replaced with a lattice rescoring algorithm by replacing the graph search consumer ($C_{GS}$) without modifying other consumers. However, the proposed architecture in this embodiment has a complex thread configuration. The number of threads per each consumer type should be selected carefully in order to achieve maximum throughput without latency degradation. One method to select the number of threads per each consumer type, is to perform an exhaustive search on the number of threads and measure the throughput performance. An alternative approach is to treat the number of threads per each consumer type as a set of hyper-parameters and use a Bayesian or gradient-descent-based optimization method for automatic optimization.

The following discussion evaluates the effectiveness of the proposed multi-user speech recognition engine architecture on a CPU-GPU heterogeneous platform on a large vocabulary version of the WSJ task. In this evaluation, a deep neural network (DNN) acoustic model was trained using the WSJ data set with a 23 dimensional Filterbank coefficient feature with global cepstral mean normalization. The resulting acoustic model contained 3,431 context dependent phonetic states and consisted of 5 hidden layers, each with 2,048 hidden units, with parameters as shown in the following table.

TABLE 1

Size of WFSTs and binary language models with 1M Vocabulary

| n-gram | # of n-gram | WFST (MB) | LM Binary (MB) |
|---|---|---|---|
| 3 (Pruned) | 6.3M | 1,258 | 173 |
| 4 | 769.9M | — | 19,543 |

An example of the specifications for the evaluation architecture is shown in Table 2 below.

TABLE 2

Evaluation Platform Specification

| | CPUs | GPUs |
|---|---|---|
| O.S. | Ubuntu 14.04 LTS | |
| Processors | Xeon E5-2697v3 | NVIDIA Titan X |
| Cores | 14 physical cores | 3072 CUDA Cores |
| Clock speed | 2.60 GHz | 1.22 GHz |
| Memory | 128 GBytes DDR4 | 12 GBytes GDDR5 |

A WFST was composed with a highly pruned 1 Million vocabulary 3-gram language model as shown in Table 1. The composed WFST is optimized offline for efficient parallel time-synchronous graph traversal on a GPU-accelerated platform. A 4-gram language model was applied during decoding for partial hypotheses rescoring. The evaluation platform consisted of a single NVIDIA Titan X GPU processor with an Intel Xeon 14-core CPU as shown in Table 2.

Using these models, the best Word Error Rate (WER) achieved was 5.1% with a decoding speed of 0.07 RTF (real-time-factor), in the offline decoding evaluation. The operating point was selected at WER 5.33% where decoding speed was 0.02 RTF. During the online evaluation, the real-time audio streaming clients read t seconds of audio samples from the audio file and send it as an audio message in t seconds interval. In this evaluation, 2,048 audio samples (16 KHz, 16 bits/sample) are sent to the ASR server for every audio message transaction. Clients are located in separated servers and are connected with the ASR server via a wired local network. These audio messages are collected until 32 batch audio frames (320 ms) are interleaved for batch processing. The number of frames per batch is closely related to the partial recognition result update frequency and the end of speech detection. Therefore, performance can be improved when not using excessively large size batches in a real-time audio transcription tasks.

TABLE 3

Consumer threads configuration ($C_{ASR}$ and $G_{GS}$ use '# lookup' threads per consumer for the parallel language model look-up up [4]s).

| | CPU | | CPU-GPU | |
|---|---|---|---|---|
| | Baseline | Proposed | Baseline | Proposed |
| # lookup | 1 | | 8 | |
| # $C_{IC}$ | 2 | 1 | 2 | 1 |
| # $C_{ASR}$ | 14 × 1 | — | 2 × 8 | — |
| # $C_{FE}$ | — | 2 | — | 2 |
| # $C_{ASC}$ | — | 10 | — | 1 |
| # $C_{GS}$ | — | 4 × 1 | — | 2 × 8 |
| # $C_{PP}$ | — | 2 | — | 1 |
| Total | 16 | 19 | 18 | 22 |

Table 3 shows thread configurations. As previously mentioned, in order to get the maximum throughput while maintaining low latency, the number of threads for each consumer type should be selected carefully. Thread configurations in Table 3 were selected carefully after performing an exhaustive search to determine the parameters which provide the best throughput of the system.

Using this architecture, the baseline architecture was compared to the alternative embodiment on both homogeneous multi-core CPU platform and CPU-GPU heterogeneous platform as described in Table 3. For the ideal user experience, an ASR server should have the capability to provide results in a given time (latency) regardless of speech duration. In this evaluation, average latency was measured between the end of speech in the audio stream to the arrival of the final recognition result when multiple active audio streams are processed concurrently to evaluate responsiveness of multi-user speech recognition systems.

Figure 3:
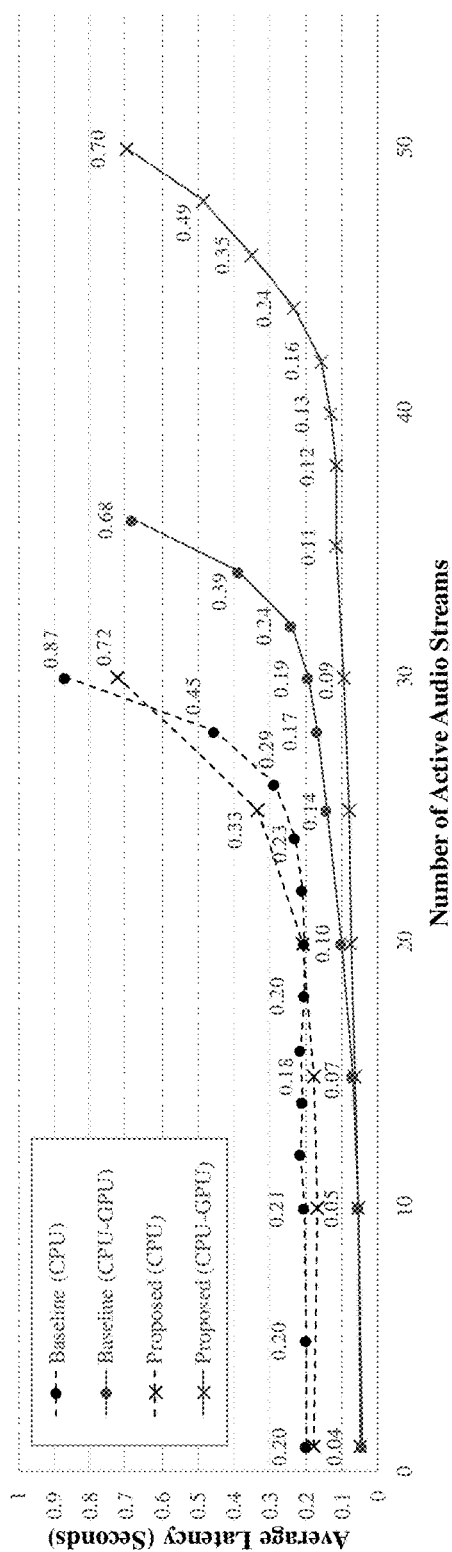
FIG. 3 is a graph depicting performance metrics of different speech recognition systems.

FIG. 3 shows the relationship between the average latency and the number of active clients. The proposed architecture of the alternative embodiment of the CPU-GPU heterogeneous platform, "Proposed (CPU-GPU)", handled more than 45 active real-time audio streams at an average latency of 0.3 seconds which is 1.36 times more server capacity compared to the GPU baseline architecture, "Baseline (CPU-GPU)", and 1.73 times more than the CPU baseline architecture, "Baseline (CPU)". In addition, proposed architecture improved the average latency from 0.2 sec to 0.04 sec when processing single client by accelerating the acoustic score computation and the graph search phases 42× and 5.6× respectively.

Figure 4:
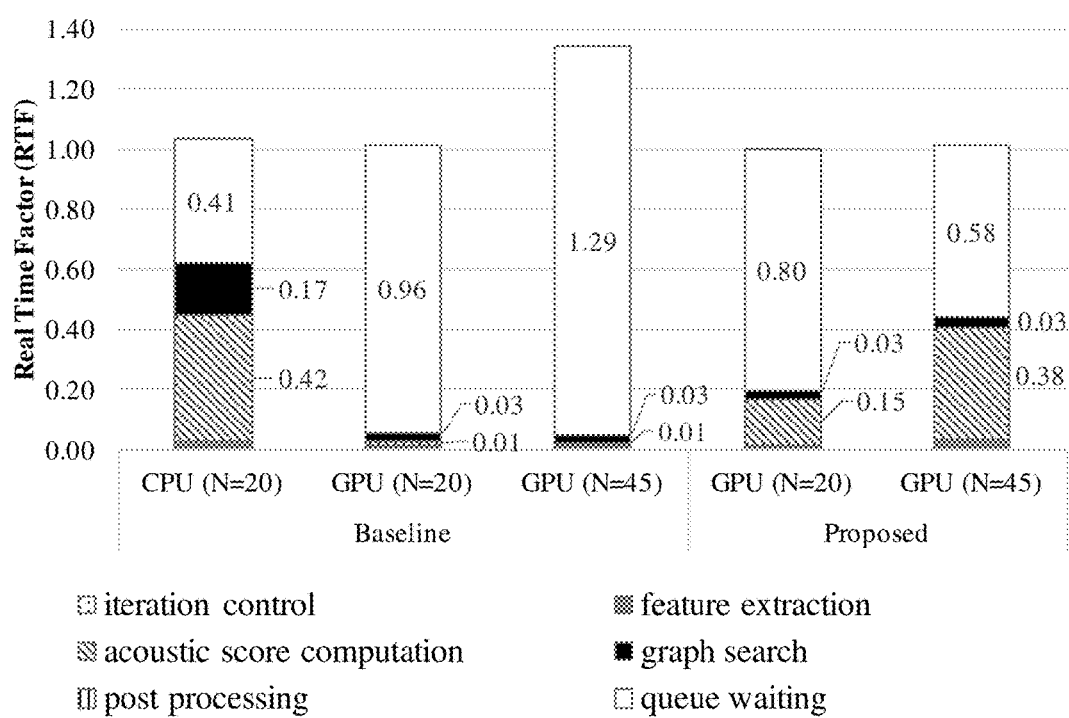
FIG. 4 is a graph showing the performance of the speech recognition engine system architecture during different phases of the speech recognition process.

FIG. 4 shows the processing time (RTF) of all ASR sub processes when the number of active clients (N) are 20 and 45. As previously discussed, the baseline architecture processes a single task at a time on the GPU. Therefore, speeds of ASR sub-processes are unaffected when the ASR system handled more active clients. The waiting times were increased because the GPU was fully occupied. Acoustic score computation time increased only 15 times and 38 times when processing 20 and 45 users in the proposed architecture because it utilizes maximum GPU computational capability by interleaving audio frames from multiple tasks.

As shown by the evaluation, the speech recognition engine system architecture efficiently shared large language models and acoustic models by applying the "producer/consumer" design pattern and maximizing GPU utilization and computational capability by interleaving audio frames across the different users. As a result, the architecture was able to process more than 45 concurrent real-time audio streams in less than 0.3 seconds. The architecture was also able to process 1.73 times more real-time audio stream than the CPU baseline architecture and 1.36 times more clients than the GPU baseline architecture.

While the disclosure has been described in detail and with reference to specific embodiments thereof, it will be apparent to one skilled in the art that various changes and modification can be made therein without departing from the spirit and scope of the embodiments. Thus, it is intended that the present disclosure cover the modifications and variations of this disclosure provided they come within the scope of the appended claims and their equivalents.

What is claimed is:

1. A method for multi-user speech recognition comprising:
   providing a computing platform comprising a Central Processing Unit (CPU) and a Graphical Processing Unit (GPU);
   utilizing a producer thread on the computing platform for accepting a speech recognition request, creating a task based on the request, and adding the task to a queue; and
   utilizing at least one of a plurality of consumer threads on the computing platform for extracting feature vectors and computing acoustic scores for the task,
      wherein the plurality of consumer threads comprises an iteration control consumer and automatic speech recognition consumer connected by a second queues,
      wherein the iteration control consumer retrieves the task from the queue, initializes a data structure, and adds the task to the second queue,
      wherein the automatic speech recognition consumer retrieves the task from the second queue, extracts the feature vectors, and computes the acoustic scores,
      wherein the automatic speech recognition consumer is divided into a plurality of different types of consumers cascaded via separate queues capable of collecting multiple tasks; and
      wherein the producer thread and the plurality of consumer threads are decoupled.

2. The method of claim 1, wherein multiple tasks are created.

3. The method of claim 2, wherein speech frames from the multiple tasks are interleaved to create a single data structure.

4. The method of claim 1, wherein computing acoustic scores comprises:
   jointly computing observation likelihoods for the feature vectors;
   updating likelihoods for the task based on observation likelihoods for feature vectors and likelihoods in a previous time step to form a set of partial hypotheses;
   computing likelihood corrections for each partial hypothesis of the set of partial hypotheses for the task;
   updating likelihoods for the each partial hypothesis of the set of partial hypotheses for the task; and
   performing back-track on the set of updated partial hypotheses and determining a most likely partial hypothesis of the set of updated partial hypotheses for the task.

5. The method of claim 1, wherein the queue transfers data between the producer thread and the plurality of consumer threads.

6. The method of claim 1, wherein the plurality of consumer threads share an acoustic model, a Weighted Finite State Transducer network, and a large language model.

7. The method of claim 1, wherein the plurality of consumer threads comprises an iteration control consumer thread, a feature extraction consumer thread, an acoustic score computation consumer thread, a graph search consumer thread, and a post processing consumer thread.

8. The method of claim 7, wherein each consumer thread of the plurality of consumer threads collects multiple tasks, thereby improving GPU utilization.

* * * * *